United States Patent Office 2,901,368
Patented Aug. 25, 1959

2,901,368

CEMENTITIOUS STRUCTURAL MATERIAL

W. J. Newell and Ted W. Lewis, Fort Worth, Tex., assignors to Waterproofing Materials, Inc., Fort Worth, Tex., a corporation of Texas No Drawing. Application February 25, 1957
Serial No. 641,859

1 Claim. (Cl. 106—95)

This invention relates to a novel composition, and it concerns more particularly a coating composition having various uses and which may be used advantageously as a plaster or stucco composition; as mortar; as a caulking composition, suitable for application with a gun; as a tile grout and adhesive, suitable for use in bonding tile to supporting structures; for the construction of concrete roofs; as a crack filler; and for other purposes.

The composition of the invention is characterized by its whiteness and is particularly suitable for use in applications where a white plaster is desired.

The composition has an unusual smoothness when applied, and can be finished by trowel to a glass-like surface, rubber floating for sand finish and by gun to outside stucco. The above finishes are so dense that stain will not penetrate the surface of the material.

A composition embodying the invention may essentially consist of the following ingredients, for example:

| | Pounds |
|---|---|
| Calcium chloride (CaCl$_2$6H$_2$O) | 10 |
| Potash alum | 5 |
| Amorphous diatomaceous silica | 12 |
| Calcium stearate | 2½ |
| Titanium dioxide | 8 |
| #1 grade silica | 75 |
| Portland cement | 376 |
| Marble dust and silica sand | 150 |

In preparing a 500 pound batch of the composition, for example, all of the ingredients except the Portland cement and the marble dust and silica sand may be thoroughly mixed together, with stirring, for about 15 minutes. The Portland cement then may be added to the resulting mixture and thoroughly mixed therewith, with stirring, for about 15 minutes. Finally the marble dust and silica sand may be added to the mixture and mixed therewith, with stirring, for about 15 minutes.

The composition described herein may be modified within reasonable limits without departing from the spirit of the invention or the scope of the appended claim.

What is claimed is:

A composition essentially consisting of the following ingredients:

| | Pounds |
|---|---|
| Calcium chloride (CaCl$_2$6H$_2$O) | 10 |
| Potash alum | 5 |
| Amorphous diatomaceous silica | 12 |
| Calcium stearate | 2½ |
| Titanium dioxide | 8 |
| #1 grade silica | 75 |
| Portland cement | 376 |
| Marble dust and silica sand | 150 |

References Cited in the file of this patent

UNITED STATES PATENTS

| Re. 16,732 | Wig | Sept. 6, 1927 |
| 326,317 | Mixer | Sept. 15, 1885 |
| 1,861,317 | Moross | May 31, 1932 |
| 2,433,450 | Grant | Dec. 30, 1947 |
| 2,643,191 | Young | June 23, 1953 |
| 2,763,561 | Burney | Sept. 18, 1956 |